(12) United States Patent
Kappacher et al.

(10) Patent No.: US 9,272,492 B2
(45) Date of Patent: Mar. 1, 2016

(54) METHOD OF INCREASING THE SCRATCH HARDNESS OF A BODY

(75) Inventors: Johann Kappacher, Piesendorf (AT); Manfred Oberkofler, Mittersill (AT); Christian Loos, Uttendorf (AT); Marco Grugger, Zell Am See (AT)

(73) Assignee: Senoplast Klepsch & Co., GmbH, Piesendorf (AT)

( * ) Notice: Subject to any disclaimer, the term of this patent is extended or adjusted under 35 U.S.C. 154(b) by 189 days.

(21) Appl. No.: 13/380,549

(22) PCT Filed: Jun. 23, 2010

(86) PCT No.: PCT/EP2010/058926
§ 371 (c)(1),
(2), (4) Date: Jan. 5, 2012

(87) PCT Pub. No.: WO2010/149710
PCT Pub. Date: Dec. 29, 2010

(65) Prior Publication Data
US 2012/0100771 A1 Apr. 26, 2012

(30) Foreign Application Priority Data
Jun. 26, 2009 (AT) .................... A 998/2009

(51) Int. Cl.
*B44C 1/165* (2006.01)
*B44C 1/17* (2006.01)
*B32B 33/00* (2006.01)
*B32B 37/00* (2006.01)
*B32B 37/15* (2006.01)

(52) U.S. Cl.
CPC ............... *B32B 33/00* (2013.01); *B32B 37/025* (2013.01); *B32B 37/153* (2013.01); *B32B 2307/584* (2013.01); *B32B 2327/12* (2013.01); *B32B 2383/00* (2013.01); *B32B 2391/00* (2013.01); *Y10T 428/31663* (2015.04); *Y10T 428/31935* (2015.04); *Y10T 428/31989* (2015.04); *Y10T 442/277* (2015.04)

(58) Field of Classification Search
USPC ......... 156/230, 240; 442/153; 428/32.6, 32.8, 428/447, 522, 537.1
See application file for complete search history.

(56) References Cited

U.S. PATENT DOCUMENTS 3,616,198 A * 10/1971 Saito .............................. 428/461
(Continued)

FOREIGN PATENT DOCUMENTS

DE 3821337 A1 12/1989
DE 3942021 A1 6/1991
(Continued)

*Primary Examiner* — Sing P Chan
(74) *Attorney, Agent, or Firm* — LeClairRyan

(57) ABSTRACT

A method for increasing the scratch hardness of a body, which has at least in some regions a surface (4*a*) consisting of an extrudated or co-extrudated plastic (4), wherein an organic, fluoro-organic or silico-organic compound (18) that increases the scratch hardness is applied to the surface (4*a*) of the extrudated or co-extrudated plastic (4), wherein the organic, fluoro-organic or silico-organic compound (11*a*, 18) is applied to the surface (4*a*) of the extrudated or co-extrudated plastic (4) by means of a sheet-like transfer medium (6, 11), on which the organic, fluoro-organic or silico-organic compound (11*a*, 18) is disposed.

12 Claims, 4 Drawing Sheets

(56) References Cited

U.S. PATENT DOCUMENTS

Figure 1:
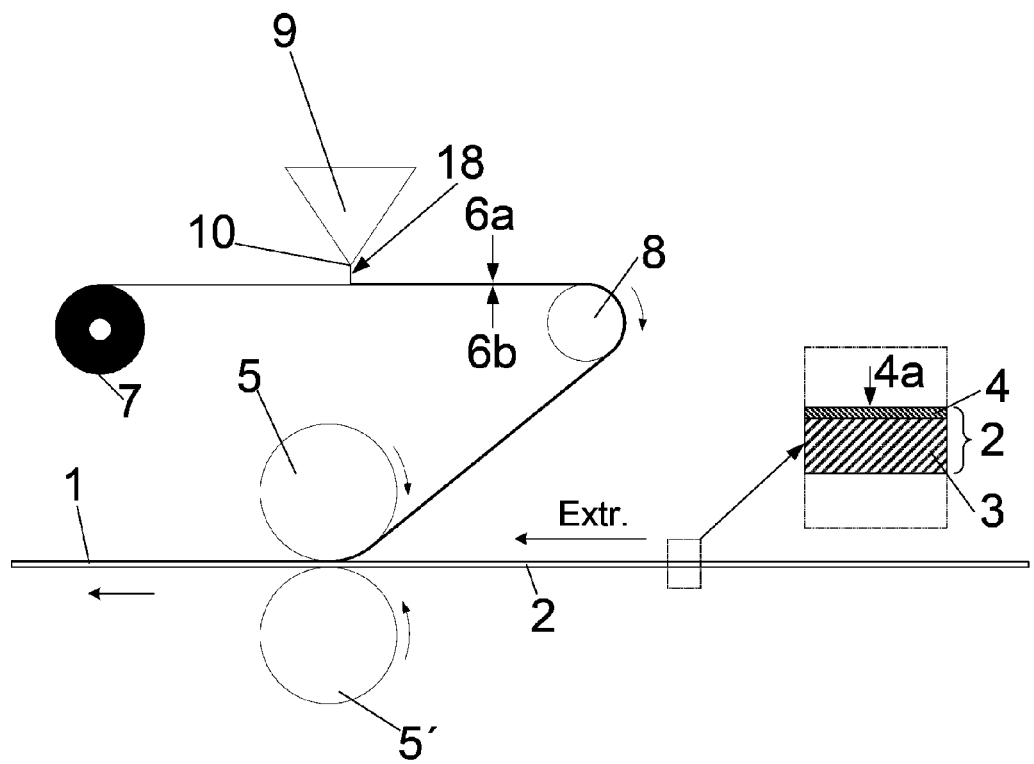

| | | | | |
|---|---|---|---|---|
| 5,976,304 A | * | 11/1999 | Horvath et al. | 156/331.1 |
| 2002/0192385 A1 | * | 12/2002 | Jenkner et al. | 427/387 |
| 2004/0076766 A1 | * | 4/2004 | Fey et al. | 427/551 |
| 2005/0074622 A1 | * | 4/2005 | Vogel et al. | 428/516 |
| 2009/0246466 A1 | * | 10/2009 | Macedo | 428/142 |

FOREIGN PATENT DOCUMENTS

| | | |
|---|---|---|
| DE | 10100383 A1 | 7/2002 |
| KR | 1020050027581 A | 3/2005 |
| WO | 2006005090 A1 | 1/2006 |
| WO | 2008002042 A1 | 1/2008 |
| WO | WO 2008002042 A1 * | 1/2008 |

* cited by examiner

METHOD OF INCREASING THE SCRATCH HARDNESS OF A BODY

The invention relates to a method for increasing the scratch hardness of a body, which has at least in certain regions a surface comprising an extrudated or co-extrudated plastic, wherein an organic, fluoro-organic or silico-organic compound that increases the scratch hardness is applied to the surface of the extrudated or co-extrudated plastic. Furthermore the invention relates to a body, which has a surface comprising at least in certain regions an extrudated or co-extrudated plastic, wherein on the surface there is disposed an organic, fluoro-organic or silico-organic compound. The invention further relates to a piece of furniture, comprising a substrate and a body of the type mentioned above that is disposed thereon. Finally, the invention relates to a transfer medium for use in the method of the type mentioned above.

Plastic surfaces have many uses in everyday life—in particular also in the furniture industry. Thereby, in the majority of the cases there is applied onto a substrate, for example a wooden board, a single- or multi-layer plastic body. Customers frequently ask for high gloss finished and extremely smooth surfaces.

As materials used having these features there are to be mentioned: glass or laminated films with different carrier materials (PET, PVC, PE, ABS etc.). Among all the materials used, glass has the hardest surface and would be rather competitive in terms of costs; it is, however, insofar disadvantageous as it is very difficult to process. Laminated films are easier to handle, they have due to the lacquer surface, however, an irregular surface (orange-peel effect).

Extrudated or co-extrudated plastics, for example having a surface consisting of acrylics, polycarbonate or polyester, have the desired optical as well as haptic features, this is, they may be easily processed and show a high gloss finished and extremely smooth as well as uniform surface. Due to the thermoplastic surface that is, however, smooth as glass, they have the disadvantage that they are susceptible to scratches. In practice, with such pieces of furniture there is at first applied a protective film to the surface, thus protecting the sensitive surface during the application of the plastic body onto the substrate or during the transport of the piece of furniture. In general, this is laminated thereon directly "in-line", this is during the extrusion/co-extrusion process, and maintained at the surface during the entire process chain. Only at the final customer, this protective film will be peeled off. In the following the surface is extremely susceptible to scratches, so that dust residues may already result in scratches in the acrylic surface already before cleaning with the help of a cloth, which is then criticized by the customers and final customers.

Methods that change plastic surfaces in their tribological behavior are known from literature. Thus, for example, waxes, fluorinated organic hydrocarbons or silico-organic compounds are used in general in order to reduce the sliding-frictional features and thereby increase the scratch hardness.

In order to increase the scratch hardness of the surface it could be envisaged to polish these or to provide these with a sealing material. These two variants show the following disadvantages:

1. Applying and polishing in the polishing or sealing means results in optical impairments on the sensitive surface.

2. In order to again remove the polishing or sealing means, residues adhering to the surface have to be removed by means of polishing discs, which usually consist of very smooth fibers. In combination with the fine particulates of the polishing means these cause impairments of the surface (so-called micro scratches).

3. The used scrubbing means further result in an enormous dust load, which is desired neither in the course of the production of furniture films nor by the final customers.

For this reason, there has been initiated the procedure of processing certain silico-organic compounds into the acrylic surface—as, for example, proposed in WO 2006/005090A1. This leads to an improvement of the surface characteristics. There has, however, been found that the silico-organic compounds added are only partly temperature-stable and will degrade in the co-extrusion or extrusion of the acrylic surface so that there will be observed undesired optical impairments.

In DE 101 00 383 A1 PMMA surfaces are chemically modified in multi-stage processes, by binding fluoro-organic compounds covalently to the PMMA surface in order to thus obtain improved scratch hardness. This method has the advantage that due to the covalent bond there is realized a rather long-term modification of the surface; it has, however, also the disadvantage that carrying out the process constitutes a big effort.

It is, hence, the task of the present invention to eliminate the problems described above and to provide a method, a body as well as a piece of furniture of the type mentioned above, wherein these problems have been reduced.

In a method of the type initially mentioned this task is solved by applying an organic, fluoro-organic or silico-organic compound by means of a sheet-like transfer medium, wherein the organic, fluoro-organic or silico-organic compound is disposed, onto the surface of the extrudated or co-extrudated plastic. The compound has the characteristic that it increases the scratch hardness and/or scratch resistance of the surface.

In a body with a surface that comprises at least in certain regions an extrudated or co-extrudated plastic, wherein there is disposed on a surface of the plastic a sheet-like plastic carrier, the task is solved by a transferable organic, fluoro-organic or silico-organic compound, wherein the organic, fluoro-organic or silico-organic compound increases the scratch hardness and/or scratch resistance of the surface of the plastic, being disposed on the side facing the surface.

The invention is based on the finding that already during the production of the body there is applied to the surface of the plastic the organic, fluoro-organic or silico-organic compound by means of a sheet-like transfer medium (onto which the organic, fluoro-organic or silico-organic compound has been applied in a preceding step) and this compound is then transferred by the sheet-like transfer medium to the surface. In contrast to known methods, wherein the desired compound is applied to the surface by means of pressure or lamination, there is provided in the frame of the invention a transfer method. The organic, fluoro-organic or silico-organic compound is a compound, which improves, this is increases, surface characteristics such as surface hardness and/or reduces sliding friction.

There is preferably provided that the surface plastic is selected from a group consisting of acrylic polymers, polycarbonates, polyesters or blends thereof.

The mentioned procedure has the following advantages:

1. There has surprisingly been found that the transfer of the compound by means of transfer medium to the surface of the plastic does not lead to negative impairments of the optical surface quality.

2. In this way, the application of the desire compound may be carried out, on the one side, already before the delivery to the furniture producer or the final customer. The application may be carried out "in-line" in the current extrusion process.

3. On the other side, it is possible to prevent that the organic, fluoro-organic or silico-organic compound has to be applied in a liquid condition so that the bottom side of the plastic body will be contaminated.

4. It is not inevitably necessary in the process to use liquid organic substances and solvents, the transfer media may be presented "ex-line" as well as "in-line" with the extrusion. (Explanation: "in-line" means that there is provided a process chain and that the individual procedural steps are carried out within a process chain, this is they are not separated in space or time; "ex-line," on the other hand, means that there is not provided only one process chain but rather individual procedural steps that are carried out separated in space and time). If pre-laminated paper is used as the transfer medium, this may be used "in-line" with the extrusion process, with the lamination of the paper being performed "ex-line", so that any solvents will not enter the extrusion process, as will be explained in greater detail below by way of the figures.

In the frame of the invention, transfer media have proven successful that have a film-like carrier and a transferable organic, fluoro-organic or silico-organic compound disposed thereon. Film-like is defined in the frame of the disclosure, for example, as a thin sheet or a body, respectively, having a rather large extension in two dimensions and, in comparison thereto, a significantly smaller extension in the third dimension. A film-like body furthermore may be coiled or rolled up. In contrast to a film-like body, there are available thicker materials that cannot be rolled up anymore and that are consequently designated as boards. Film-like bodies typically have a thickness of several millimeters, preferably smaller than 1 millimeter. The carrier medium in the preferred case has at least a dimension so that the entire surface of the plastic may be covered or the entire surface is covered, respectively.

In a first embodiment variant there may be provided that the film-like carrier medium comprises paper, preferably a paper composite.

Suitable papers are those that may transfer the organic, fluoro-organic or silico-organic compound to the surface of the plastic. The paper composites may consist of several layers. One paper layer then may have on one side at least a plastic layer, wherein on the plastic layer there is disposed the transferable organic, fluoro-organic or silico-organic compound. On the paper layer, however, there may also be disposed a plastic layer, in which the organic, fluoro-organic or silico-organic compound is integrated. The paper layer may also have at least a plastic layer on the second side. Duroplasts, thermo-setting plastic, elastomers or silicones have proven to be advantageous plastics in the frame of the invention. Especially preferably these are cross-linked silico-organic polymers.

In a second embodiment variant there may be provided that the film-like carrier medium consists of at least one plastic layer. Also multi-layered carrier media are possible, wherein also herein plastics like duroplasts, thermo-setting plastics, elastomers or silicones have proven successful in the frame of the invention. Especially preferably these are thermo-setting plastics on the basis of polyolefins, such as, for example, polypropylene or polyethylene.

The transfer medium is preferably a transfer film. The transfer medium may be maintained on the acrylic top side, in particular until delivery to the customer. In order to apply the organic, fluoro-organic or silico-organic compound the transfer medium, preferably the transfer film, may simultaneously also be formed as a protective film. In this way, there may be applied in one procedural step with the application of the organic, fluoro-organic or silico-organic compound also the preferably peelable protective film to the surface. The protective surface may be laminated, or it may be formed as a peelable lamination film. Applying the organic, fluoro-organic or silico-organic compounds may be carried out "in-line" or "ex-line" with the extrusion process. The protective film may, as is generally known, consist, for example, of a thermo-setting plastic. Preferred materials are polyolefins such as polyethylene and polypropylene. Polyester compounds, such as BOPET (biaxially-oriented polyethylene terephthalate), may also be used. In addition, the transfer medium or the protective film, respectively, may also have an adhesive. The adhesive may be disposed as a layer of its own on the transfer medium or the protective film. There is preferably provided that the organic, fluoro-organic or silico-organic compound be disposed on the adhesive or integrated in the adhesive layer. As adhesives, there may be used, for example, adhesives, which are commonly known to be used for films, on the basis of an acrylate, polymer mixtures containing acrylates or EVA or polymeric mixtures, respectively, containing EVA (ethylenevinyl acetate).

As an alternative there may be provided that the transfer medium is peeled off immediately afterwards. In this case, in order to protect the surface of the plastic, there is laminated thereon in addition a peelable protective film, which may possibly be maintained on the surface until the assembly of the finished piece of furniture.

For the method, the composite body and also the piece of furniture there is provided in advantageous embodiments that the polymer comprises an acrylic polymer such as a polyacrylate, preferably PMMA or HI-PMMA (impact-modified PMMA), that it is preferably formed as such one. In addition, the surface may be pre-treated with corona or plasma before the application of the organic, fluoro-organic or silico-organic compound.

In the frame of the invention the organic, fluoro-organic or silico-organic compounds may also be applied to the surface of the extrudated or co-extrudated plastic in a physical or chemical way. What is said above is also effective for the physical or chemical transfer. The compounds applied, however, differ in a chemical point of view. For the "physical" variants, there may, for example, be used waxes, fluorinated hydrocarbons or silico-organic compounds, as known from WO 2006/005090A1. Preferred exemplary embodiments comprise PDMS (polydimethyl siloxane) as silico-organic compound, PTFE (polytetrafluoro ethylene) as fluoro-organic compound, or waxes as organic compounds.

The improvement of the surface characteristic of an acrylic surface is explained in the following table. Therein, the compounds respectively mentioned are applied to the PMMA surface of a PMMA-ABS co-extrudated plastic body (designation of the applicant SENOSAN® AM 1500X):

| Lamination | Optical (subjective) | Micro scratch hardness (of the surface according to ISO 4586-2.14) [N] | Sliding angle PMMA [degree] | Surface tension (with corona test ink) [nN/m] |
|---|---|---|---|---|
| None | 1 | 0.3 | 32° | >35, <38 |
| Silico-organic | 1 | 0.8 | 19° | >22, <24 |
| Fluoro-organic | 2 | 0.9 | 12° | >26, <32 |
| Organic | 5 | 0.9 | 11° | >32, <35 |

(optical assessment: 1 = very clean (ideal) to 5 = insufficient (undesired))

The following compounds were tested, among others, and are referred to as examples:

Silico-organic: PDMS (polydimethyl siloxane)—lamination, silico-oil of the company Wacker Chemie, series AK100

Fluoro-organic: PTFE (polytetrafluoro ethylene) release agent and lubricant (polytetrafluoro ethylene)

Organic: BYK® wax (Ceracol® 609N, wax-modified lanoline dispersion)

In regard to the testing the sliding angles, there is to be added that there was used a motorized adjustable swiveling table for this purpose. On this table, there was placed the plastic board to be tested and thereon the test weight consisting of a metal cuboid. This has been adhered on one side to an ABS board (support area: 63×63 cm/total weight: 500 g). The test starts with a sliding angle of 0°, and the adjustable support table is then lifted upwards until the test weight starts to slide off for the first time. Then the sliding angle is taken at the lateral scaling. The test is carried out 3 times per sample at different positions.

In regard to testing the surface tension there is to be added that there were used corona test inks with differently defined surface tensions (company ARCOTEC GmbH) for this purpose. If the test ink has a lower surface tension than the plastic surface to be tested, the liquid will distribute uniformly. If the surface tension of the test ink, however, is the same as or higher than that of the plastic surface, the liquid will concentrate and is prone to form droplets.

The scratch hardness or the micro scratch hardness, respectively, is evaluated according to ISO 4586-2.14. There are cut out 3 sample bodies 100×100 mm from the product. In the intersection of the diagonal there is drilled a hole with a diameter of 6.5 mm. The surfaces to be tested are then purified with an agent such as ethyl alcohol that will not attack the sample bodies and a smooth cloth and stored for 24 h in normal conditions. The principle of the scratch test is that a weight-loaded tip of a diamond (angle 90°, tip radius 90 μm) is pulled over the layer. The measurement is carried out using a Universal Scratch Tester (model 413). In order to calibrate the weight arm, there is required one of the weights as well as the counter-weight with integrated level. The weight is placed on the scale arm so that the knurled screw points to the front for locking the weight. Then it is pushed on the scaling arm as far to the right (to the point of rotation) until the left side (with marking) is aligned with the scaling value "0". The counter-weight is then placed to the right of the point of rotation (and of the weight-load) and pushed until the arm is in the horizontal position upon free swinging (control by the level). By tightening the knurled screw, the counter-weight is locked on this position. The scaling arm with the test tool and the weight to be used is then balanced. The sample is placed centrally on the sample plate. By careful rotation of the knurled nut in a clock-wise direction, the sample plate is then tightly clamped by the pressure member. The scaling arm may be adjusted by the knurled nut in its height in order guarantee that the top side of the arm always extends horizontally. The weight is pushed on the scaling arm to the value 0.1 in order to slightly load the clamped sample. The horizontal position of the scaling arm may be precisely determined by the level in the counter-weight and corrected by lifting or lowering, respectively, the axis with the aid of the knurled nut. According to the weight selected, a maximal force of 1 N or 10 N, respectively, may become effective. Each partial line on the scaling arm corresponds to a load force of 0.01 N or 0.1 N. The predetermined load is obtained by sliding the weight. The sample plate is rotated once about the axis thereof with a rate of 5 rpm. As a measure for the scratch hardness of the tested material there is indicated the smallest load force, which leaves a closed marking on the sample body; this is if, following the first load stress, there are already visible significant marks, the load has to be gradually reduced. If there are not visible any marks, the load has to be gradually increased. In order to obtain statistical information, there are tested three test boards. At first, the stressed surface is cleaned with a solvent (for example, ethanol) that does not attack the sample body and a smooth cloth. The sample body is then attached to the rotatable table of the observation device, covered by an observation template, and then inspected with the naked eye in an observation distance of 400 mm in regard to permanent marks. These have to be continuously visible in all segments of the observation template. The template may in addition be moved on the sample body if required. A mark is considered as permanent if it is still visible 24 hours following the test (storage in normal climate). For this reason, it is necessary to swivel the sample body in the observation device on the rotatable table for evaluation from all angles of incidence of the light. As a measure for the behavior of the scratch stress, there is taken the smallest weight load resulting in a closed mark on all 3 sample bodies.

Before applying the respective compound, the surface of the plastic may be pre-treated using corona.

In a chemical surface modification, the organic, fluoro-organic or silico-organic compound may be covalently bound to the surface of the plastic, this is at a reactive residue of the acrylic compound. For this purpose it is possibly necessary to activate the surface. This may be realized, for example, by electron bombardment, plasma or corona pre-treatment. As reactive compounds for application, there may, for example, be used siloxanes with double-bonds. The reaction may be carried out as a radial reaction. For possible compounds and for the exact procedure conditions, there is to be made reference herein to DE 101 00 383 A1.

In a further aspect the invention relates to a piece of furniture with a plastic body of the type mentioned above. In a piece of furniture according to the invention there is provided that it comprises a substrate and a plastic body of the type mentioned above applied thereon. The surface is disposed on the side of the plastic body which is arranged opposite to the substrate. It has been found advantageous for the piece of furniture if the substrate comprises wood or wood fiber fabric such as wooden boards. There may also be used light-weight structure elements such as, for example, paper honeycomb cores as a substrate.

Figure 2:
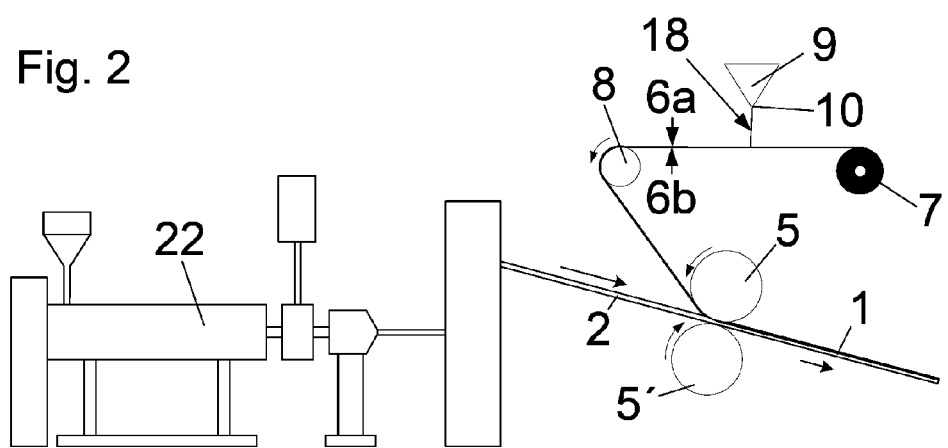
Figure 3:
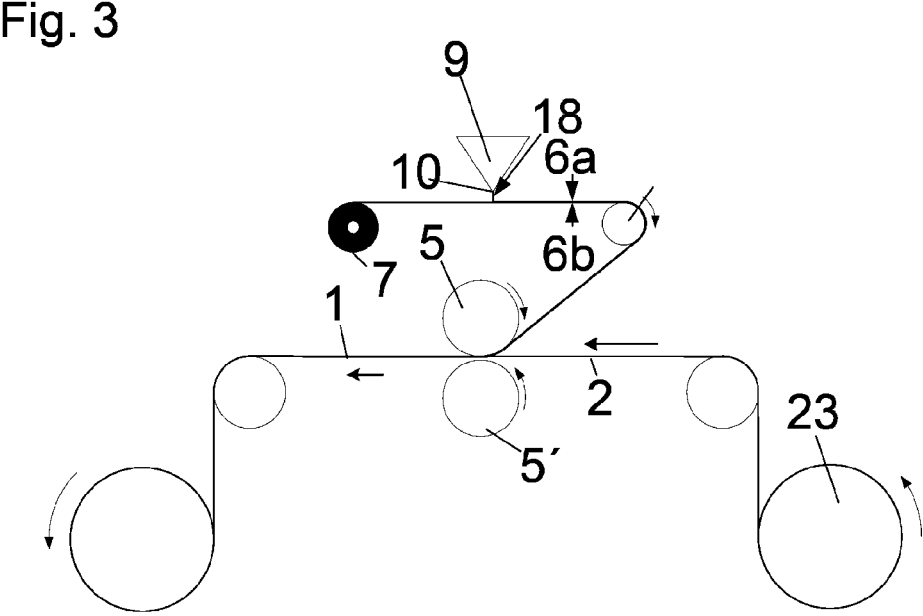
Figure 4:
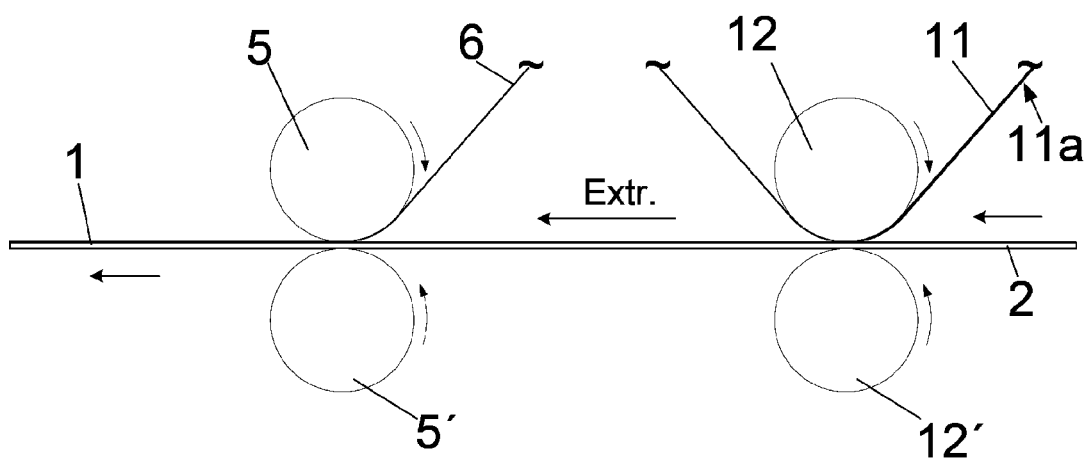
Figure 5:
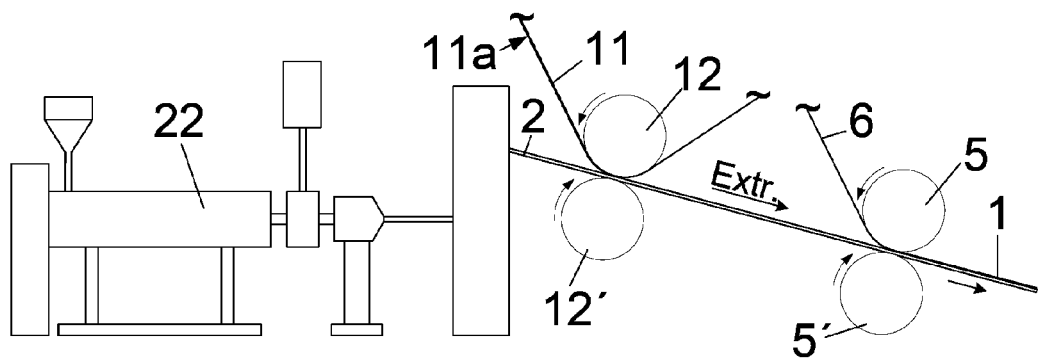
Figure 6:
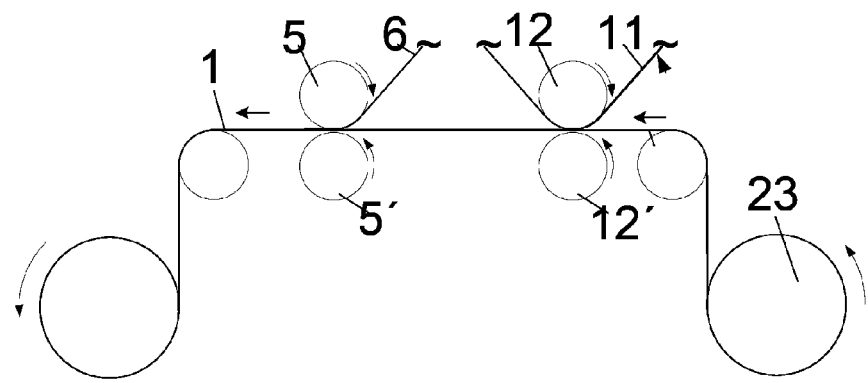
Figure 7:
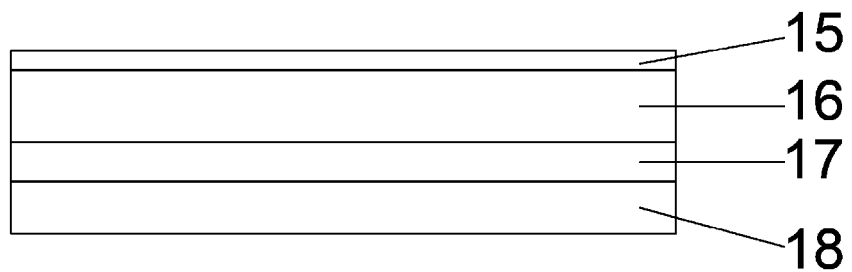
Figure 8:
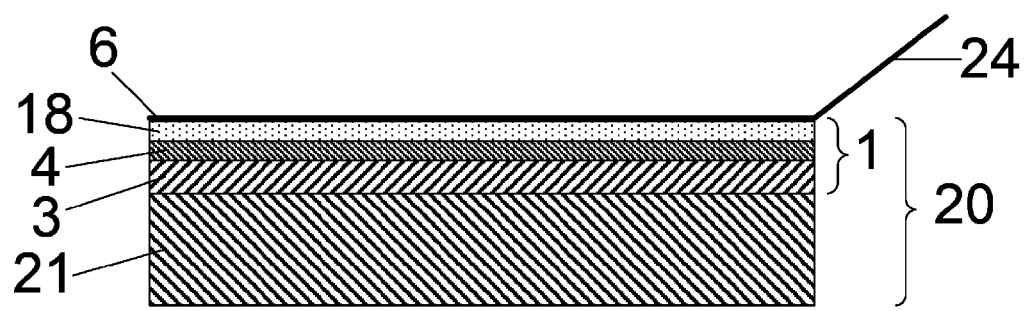

Further details and advantages of the invention are obvious from the figures and figure descriptions given below, wherein:

FIG. 1 is an embodiment variant of the method according to the invention for the production of a body, FIG. 2 is the variant according to FIG. 1 with the co-extrusion step, FIG. 3 is the variant according to FIG. 1 with a pre-manufactured co-extrudate, FIG. 4 is a second embodiment variant for a method according to the invention for the production of a body using a transfer medium with subsequent lamination of a protective film, FIG. 5 is the variant according to FIG. 4 with the co-extrusion step, FIG. 6 is the variant according to FIG. 4 with a pre-manufactured co-extrudate, FIG. 7 is a multi-layered transfer medium according to the invention and FIG. 8 is a piece of furniture according to the invention.

In FIG. 1 there is shown a procedural step for the production of a body 1 according to the invention. At first a plastic 4 such as, for example, an acrylic polymer, namely PMMA with a co-extrudatable plastic carrier 3, like ABS is co-extrudated according to a known method so that there is produced an at least two-layered crude plastic body 2. Also other thermo-setting plastics, which may be envisaged for co-extrusion with PMMA, may be used. The body 1 could, however, also have further layers. The body could, for example, be a multi-layered co-extrudate with three or more co-extrudated layers. In the section of FIG. 1, this crude plastic body 2 is illustrated in an enlarged view. As the co-extrusion step is already known, depiction thereof has been omitted in FIG. 1. The obtained co-extrudate (crude plastic body 2) forms a path leading to two calender rollers 5, 5'. The crude plastic body 2 has a single-layered plastic carrier 3 made of ABS (also here the plastic carrier 3 may be formed in several layers) and a cover layer 4 containing an acrylic polymer (for example, PMMA). The crude plastic body 2 is moved through the calender rollers 5, 5' in the image plane to the left. Onto the crude plastic body 2 there is laminated a protective film 6 by means of the calender rollers 5, 5'. The peelable protective film 6 serves to protect the surface 4a of the acrylic cover layer 4 or the acrylic polymer, respectively. The protective film 6 is then available rolled up on a roll 7, it is unrolled and guided via a deflection roll 8 to the upper calender roller 5, which then laminates the protective film 6 on the crude plastic body 2. From a container 9 with a slit 10, now the organic, fluoro-organic or silico-organic compound is applied to the surface 6a of the protective film 6. In this way, the organic, fluoro-organic or silico-organic compound 18 may be directly applied across the protective film 6 to the acrylic surface 4a. The protective film 6, hence, not only serves for protecting the crude plastic body 2 but also assumes the function of the transfer medium or the transfer film, respectively.

In FIG. 2 a variant of the process of FIG. 1 is again explained in greater detail, wherein the co-extrusion step is further illustrated. The co-extrusion plant 22 co-extrudates PMMA 4 with ABS 3 into the crude plastic body 2, which then is subjected to the other procedural steps explained in FIG. 1.

In FIG. 3 there is shown a second variant of the process of FIG. 1. Instead of the co-extrusion of PMMA and ABS during the application process of the compound 18, herein the crude plastic body 2 is present in the form of a roll 23. The crude plastic body 2 is then withdrawn from the roll 23 and subjected to the other procedural steps of FIG. 1.

In FIG. 4 there is provided an alternative embodiment variant, wherein the organic, fluoro-organic or silico-organic compound 18 is not applied through the protective film 6 but rather through a transfer film in the form of a laminated paper 11. Therein, there is at first (as also commonly known) produced a co-extrudate 2 from PMMA and ABS, which then runs through the calender rollers 12, 12'. A sheet-like transfer medium 11 (here, laminated paper) carrying at the surface 11a the organic, fluoro-organic or silico-organic compound is pressed to the surface by means of the calender roller 12 and transfers the organic, fluoro-organic or silico-organic compound through the pressure applied by the calender rollers 12, 12'. The transfer medium 11 or the laminated paper, respectively, may be prepared and stored on a roll (not shown). In this way, the application of the organic, fluoro-organic or silico-organic compound 18 to the transfer film may be decoupled before the application of the organic, fluoro-organic or silico-organic compound 18 to the acrylic surface 4a. Subsequently, a peelable protective film 6 is applied by means of a second calender roller unit 5, 5' in order to protect the plastic body 1. It would, however, also be possible to laminate the paper in-line and to simply use it as a reverse medium.

The embodiment variant of FIG. 5 shows the method according to FIG. 4 with the preceding extrusion steps. In the co-extrusion plant 22 PMMA and ABS are co-extrudated into the crude plastic body 2, which is then subjected to the method described in FIG. 4.

In FIG. 6 there is shown an alternative to the variant of FIG. 5, wherein the crude plastic body 2 has already been manufactured in a preceding step and intermediately stored on a roll 23. The subsequent steps are obvious from FIG. 4.

An alternative that is not shown would be the combination of the measures of the preceding figure. A protective film 6, for example, could be provided with the organic, fluoro-organic or silico-organic compound 18 in a preceding step. Subsequently, the protective film 6 could be rolled up, intermediately stored and only at a later point of time be applied to the crude plastic body 2. The advantage of this variant is the complete decoupling of the application of the organic, fluoro-organic or silico-organic compound 18 to the transfer medium from the residual manufacture process. The disadvantage of this variant, however, is the fact that the compound 18 in this way will also contact the bottom side 6b of the protective film. In theory, also the transfer medium 11 of FIG. 4 could be provided with the organic, fluoro-organic or silico-organic compound "in-line" (as in FIG. 1).

In FIG. 7 there is schematically shown a transfer medium 11 or a transfer film 11, respectively, which could be used as shown in the example of the FIGS. 4 to 6. This has a thermo-setting plastic surface layer 15 of polyethylene, thereon a paper layer 16 and finally a further polymer layer 17, for example made of cross-linked silico-organic polymer. An organic, fluoro-organic or silico-organic compound 18 is applied to the polymer layer 17.

In FIG. 8 there is shown a finished piece of furniture 20 according to the invention. This has a substrate 21, to which there is applied the composite body 1 according to the invention. The composite body 1 consists of a single-layered plastic carrier 3 made of ABS, a cover layer 4 made of acrylic polymer, namely PMMA and a peelable protective film 6 disposed thereon. A lap 24 indicates the peelability of the protective film 6. In-between the protective film 6 and the acrylic surface there is indicated in dots the organic, fluoro-organic or silico-organic compound 18. The organic, fluoro-organic or silico-organic compound 18 is disposed on the protective film 6 and is then in the course of the time transferred to the cover layer 4.

The invention claimed is:

1. A method for increasing the scratch hardness of a body comprising the steps of:
   extrudating or co-extrudating a plastic body, the body having at least in some regions a surface comprising an extrudated or co-extrudated plastic, wherein
   applying an organic, fluoro-organic or silicoorganic compound that increases the scratch hardness is applied to the surface of the extrudated or co-extrudated plastic, wherein the organic, fluoro-organic or silico-organic compound is applied to surface of the extrudated or co-extrudated plastic by means of a sheet-like transfer medium on which said organic, fluoro-organic or silico-organic compound is disposed and wherein said organic, fluoro-organic or silico-organic compound is then transferred by said sheet-like transfer medium to the surface and wherein said organic, fluoro-organic or silico-organic compound binds physically or chemically to at the surface to the extrudated or co-extrudated plastic;

wherein the steps of applying and transferring the organic, fluoro-organic or silico-organic compound to the surface of the body are performed in-line during the extrusion process.

2. A method according to claim 1, wherein the surface comprises a plastic selected from the group consisting of acrylic polymers, polycarbonates, polyesters or blends thereof.

3. A method according to claim 1, wherein the transfer medium is formed like a film.

4. A method according to claim 1, wherein the transfer medium is formed as a protective film.

5. A method according to claim 1, wherein the transfer medium comprises paper.

6. A method according to claim 5, wherein the transfer medium comprising paper has at least one plastic layer, wherein the organic, fluoro-organic or silico-organic compound is applied to or in the surface of the at least one plastic layer or is introduced into the plastic layer.

7. A method according to claim 1, wherein the transfer medium is laminated to the surface.

8. A method according to claim 7, wherein the transfer medium remains on the surface of the plastic, preferably at least for another procedural step.

9. A method according to claim 7, wherein the transfer medium is immediately subsequently peeled off.

10. A method according to claim 1, wherein the organic, fluoro-organic or silico-organic compound physically binds at the surface.

11. A method according to claim 1, wherein the organic, fluoro-organic or silico-organic compound chemically binds at the surface.

12. A method for increasing the scratch hardness of a body comprising the steps of:
    extruding a plastic body, said plastic body including a carrier and a surface;
    applying a protective film over said plastic body;
    passing a transfer medium by a container holding a compound selected from the group consisting of organic, fluoro-organic or silico-organic compounds;
    applying said compound to said transfer medium while said medium moves by said container, thereby simultaneously forming a peelable protective film; and
    passing said peelable protective film and said extruded plastic body between a pair of opposed rollers, said compound reacting with said surface of said plastic body to increase the scratch hardness of said plastic body.

* * * * *